Aug. 16, 1927.

J. A. REECE 1,639,466

DRAWING SHEET GLASS

Filed May 29, 1924

INVENTOR,
Joseph A. Reece
C. A. Rowley
ATTORNEY.

Aug. 16, 1927.  
J. A. REECE  
1,639,466

DRAWING SHEET GLASS

Filed May 29, 1924    2 Sheets-Sheet 2

INVENTOR.
Joseph A. Reece
C. A. Rowley
ATTORNEY

Patented Aug. 16, 1927.

1,639,466

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed May 29, 1924. Serial No. 716,565.

This invention relates to improvements in the art of drawing sheet glass, and more particularly to an improved system for feeding molten glass to the shallow pool from which the glass sheet is drawn.

One of the principal objects of the invention is to increase the productive capacity of the continuous tank furnace which furnishes the molten glass. By employing the principles of this invention a much greater daily production of sheet glass can be obtained from a furnace of given size.

Another object is to so regulate and distribute the supply of molten glass to the draw-pot or receptacle as to insure an equal flow of glass from both sides into the sheet source and to avoid inactivity or stagnation in any part of the receptacle containing the molten pool.

In the Colburn system of drawing sheet glass, as shown for example in the patent to I. W. Colburn, 1,248,809, granted Dec. 4, 1917, the glass-producing materials are melted in one end of a rather long tank furnace, the molten glass flowing through the settling and refining portions of the tank to the opposite end where the surface glass flows into a shallow receptacle from which the sheet is drawn. Experience has shown that in installations of this type, although the main tank portions may hold a body of glass having a depth of several feet, only the upper stratum to the depth of a very few inches flows freely through the tank, and the lower strata of the molten glass are practically stagnant. Now it is essential that the molten glass remain a certain length of time in the tank to become properly refined before it may be successfully drawn into sheet form, and the surface area of this type of tank must bear such a relation to the amount of glass drawn from the tank that the surface glass will remain in the tank for the proper refining period. For example, if one attempted to draw two sheets from a furnace designed to draw a single sheet, the drain on the tank would be such that the surface stratum of glass would flow too rapidly through the furnace and would not have time to become properly refined. It has been considered necessary in such cases to greatly increase the surface area of the tank so that the rate of flow for the increased output would still allow all of the mobile surface glass to remain in the tank the necessary length of time.

According to this invention, the increased production is accomplished by increasing the depth and hence the volume of flow of the molten glass through the tank. For example, if the flowing stream of glass were made twice as deep as before, the size, or the drawing rate of the sheet could be substantially doubled without increasing the rate of flow through the furnace over that in present installations. This end is reached by withdrawing the molten glass, from which the sheet is subsequently formed, from the lower strata of glass in the tank, thus necessitating the flow of the lower and now inactive portions of the molten glass.

In the form of the invention here disclosed, the shallow open container for the pool of glass from which the glass sheet is drawn upwardly, is so positioned and connected with the tank furnace, that the molten glass flowing into the shallow pool is drawn from the sub-stratum glass in the tank. That is, the surface glass does not flow continuously from the tank into the shallow receptacle, but the pool in the shallow receptacle is supplied with glass taken from beneath the surface of the tank.

The objects and advantages of the invention will be more clearly understood from the following detailed description of certain approved forms of the apparatus.

Figure 1:
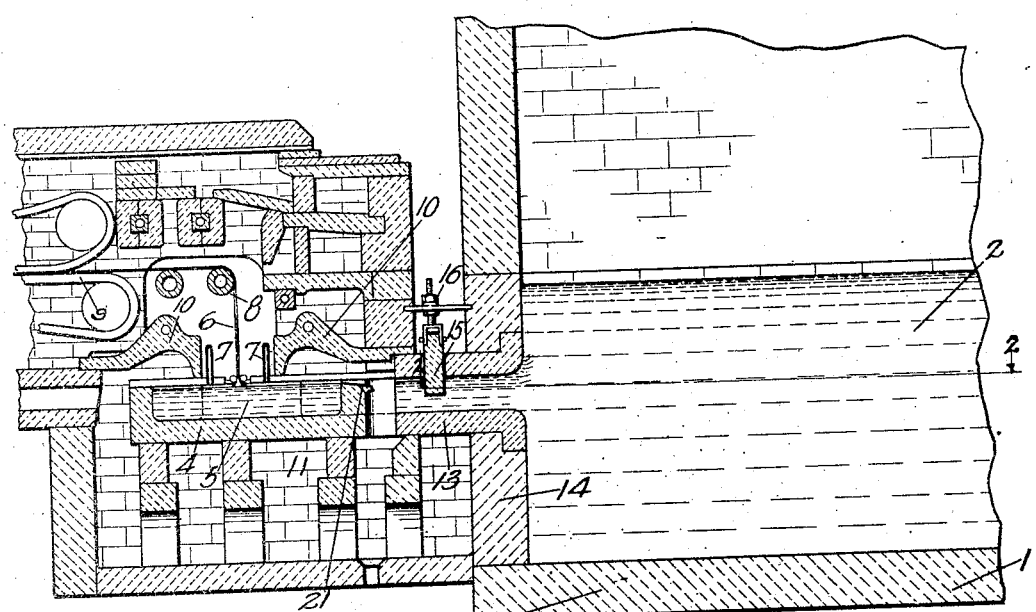
Fig. 1 is a vertical longitudinal section through the apparatus taken substantially on the line 1—1 of Fig. 2.
Figure 2:
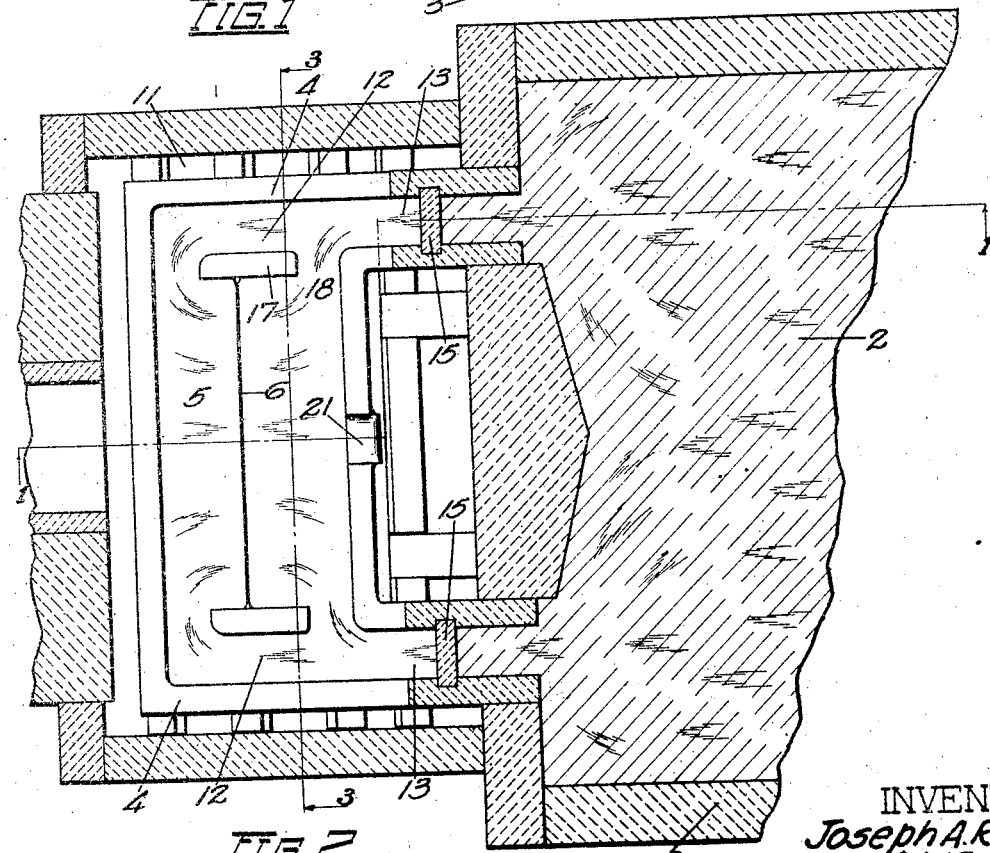
Fig. 2 is a horizontal section taken substantially on the lines 2—2 of Figs. 1 and 3.
Figure 3:
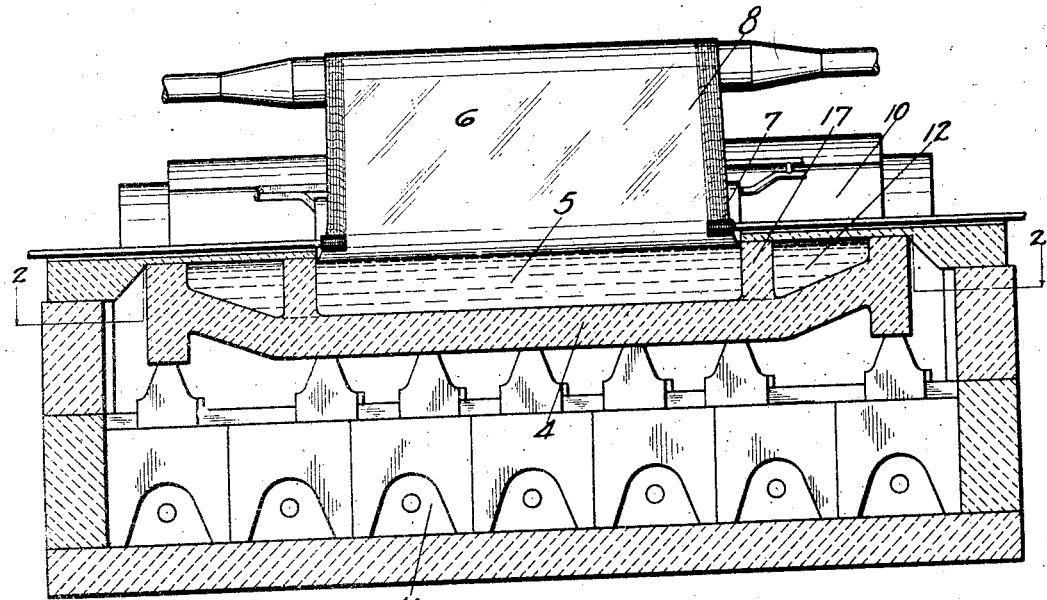
Fig. 3 is a transverse vertical section taken substantially on the line 3—3 of Fig. 2.

Referring first to Figs. 1, 2 and 3 of the drawings, 1 indicates the continuous tank furnace, the molten glass 2 being first produced in the melting end of the furnace, not here shown but being at the right of Fig. 1, this glass flowing slowly through the furnace to the refining end 3 shown in the drawings. At 4 is indicated the shallow receptacle for the pool of molten glass 5 from the surface of which the glass sheet 6 is drawn upwardly. This sheet 6 is drawn up from an exposed area of the surface of pool 5 between a pair of coolers 7 which chill the sheet and sheet source to the proper drawing temperature. The sheet is bent while still plastic about a bending roller 8 and then carried away through drawing and flattening mechanism 9 into the lehr. All of the surface glass in pool 5, except the cooled area from which the sheet is drawn, is covered and protected by suitable cover-tiles 10, and the container 4 is mounted above a heating chamber or furnace 11 which maintains the pool 5 at the proper temperature. All of the above is substantially as now in use and referred to in the Colburn patent referred to hereabove.

In the installation here disclosed the container 4 is positioned considerably lower than has heretofore been the case so that the glass level of shallow pool 5 will be considerably below the glass level in the tank 1. In the form disclosed in Figs. 1, 2 and 3, the container 4 is made somewhat wider than the glass sheet 6 to provide for glass passages 12 at the sides of the sheet forming area. These passages 12 are in direct comunication with conduits 13 which extend through the adjacent side wall 14 of the tank 1 at a level considerably below the surface of the glass in the tank, as best shown in Fig. 1. Gates or closures 15, slidable vertically through conduits 13 and regulated by adjusting screws 16, serve to regulate the flow of glass through conduits 13 into the container 4.

As shown in Figs. 1, 2 and 3, short vertically extending partitions 17, rising from the bottom of container 4, limit the two ends of the sheet forming area of glass in container 4 and define one side of the passages 12 at the two sides of the container. The glass which flows into the container through passages 13 will divide, part of it flowing in at 18 to supply the side of sheet 6 nearest the tank, and the remainder flowing through passages 12 to the closed end of container 4 to supply the other side of sheet 6. This insures a free and uniform supply of glass to both sides of the glass sheet.

Figure 4:
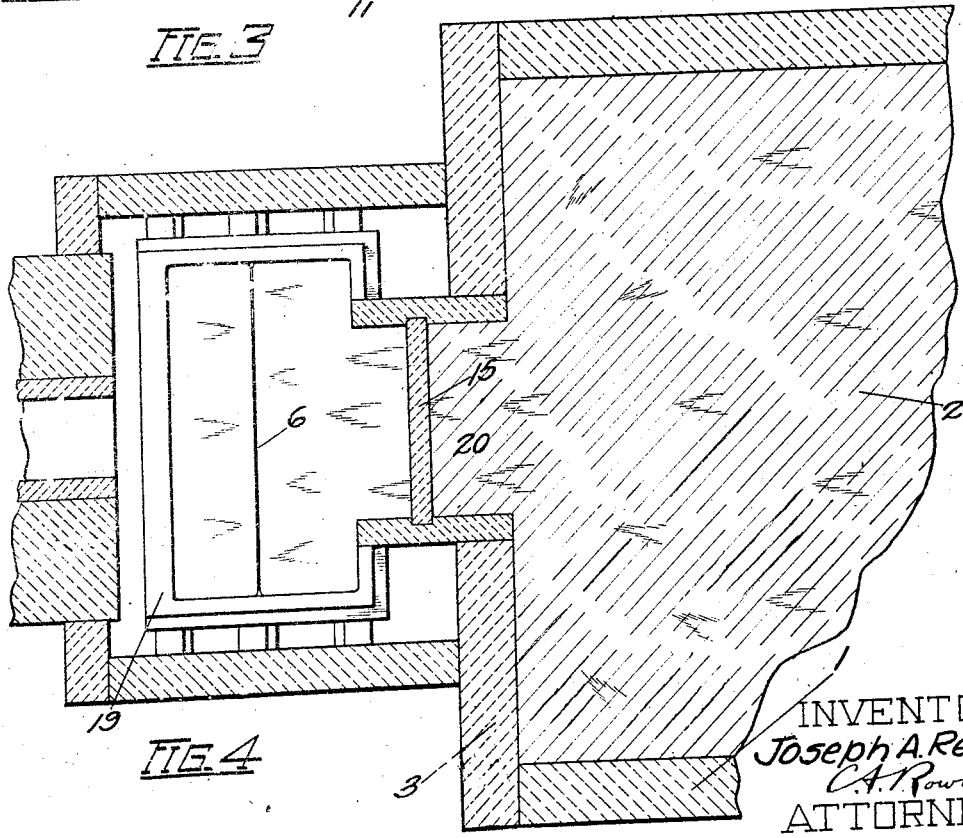
Fig. 4 is a view similar to Fig. 2 of a modified form of the apparatus.

In the simpler form of the apparatus disclosed in Fig. 4, the container 19 is made narrower than that shown in Fig. 2, having substantially the same inside width as glass sheet 6, as in installations now in use. In this form of the apparatus a single conduit 20 is provided between tank 1 and the container 19, this conduit being provided with a gate or closure 15 as in the form first described. Otherwise this modification is the same as that shown in Figs. 1, 2 and 3.

In either form of the invention the closures 15 will be so adjusted that the supply of molten glass flowing in from tank 1 to supply the shallow pool 5 will be just sufficient to replace that drawn away in the form of glass sheet 6. An overflow passage or spillway may be provided as indicated at 21 (Figs. 1 and 2), to carry away any excess of glass that may flow into container 4 and prevent the glass level therein from rising to an excessive height.

It will be seen that the supply of molten glass drawn from the tank 1 is taken from a location considerably below the glass level in the tank. This will necessitate a deeper flow of glass through the tank, consequently a greater volume of glass in motion and a slower flow of the surface glass, and the glass removed and drawn into sheet form will remain a longer period in the tank than would be the case if only the surface glass were drawn upon. In this way the refining operation can be successfully carried out without necessitating the use of an exceedingly large tank. The fact that the pool 5 from which the sheet is drawn is positioned below the lower glass level in tank 1, insures a constant head of glass to supply the pool 5 and also insures a constant glass level in the pool regardless of the intermittent feeding operations at the melting end of the furnace. Also, since the flow of surface glass is interrupted at the gates 15, there can be no continuous lines or other glass formations extending back from the sheet source into the furnace glass, and one possible cause of waves and irregularities in the sheet surfaces is eliminated.

I claim:

1. The method of drawing sheet glass, which consists in supplying a draw-pot with sub-surface glass from a glass melting furnace, drawing a sheet vertically therefrom, and flowing from said pot any surplus glass contained therein.

2. In sheet glass drawing apparatus, a glass melting tank, a pot for containing molten glass in communication with the tank, means in the tank permitting only sub-surface glass to flow into the pot, means for heating the glass in the pot to maintain it at a suitable working temperature, and a spillway for maintaining the glass in said pot at a constant level.

3. In sheet glass drawing apparatus, a glass melting tank having outlets below the glass level therein, a draw pot in communication with the outlets, means in the outlets for controlling the flow of glass into the draw pot, a spillway for controlling the glass level in the pot, and a heated chamber surrounding the draw pot and outlets.

4. The process of drawing glass, including tapping a glass supply reservoir below the level of the glass contained therein, and causing the glass at this lower level to flow around opposite ends of the glass being drawn to supply both sides thereof, and heat treating the glass thus tapped.

5. The method of drawing sheet glass, which consists in supplying a draw pot with sub-surface glass from a glass melting furnace, drawing a sheet of glass vertically from said pot, causing the glass entering said pot to flow around opposite ends of the sheet forming area to supply both sides of the glass being drawn, and causing any surplus glass to flow from said pot.

6. In sheet glass drawing apparatus, a glass melting tank provided with a plurality of conduits positioned beneath the level of the molten glass contained therein, and a draw-pot provided with passages aligning with said conduits for causing the glass from the tank to flow to both sides of the glass being drawn from said pot.

7. In sheet glass drawing apparatus, a glass melting tank provided with a plurality of conduits positioned beneath the level of the molten glass contained therein, and a draw-pot provided with passages aligning with said said conduits for causing the glass from the tank to flow to both sides of the glass being drawn from said pot, said pot being provided with an overflow passage for controlling the glass level therein.

8. In sheet glass drawing apparatus, a glass melting tank provided with a plurality of conduits positioned beneath the level of the molten glass contained therein, a stationary draw-pot provided with passages in direct communication with said conduits, and means for limiting the two ends of the sheet forming area of glass and for defining one side of said passages, said means directing the flow of glass around opposite ends of the sheet forming area to both sides of the glass being drawn.

9. In sheet glass drawing apparatus, a glass melting tank provided with a plurality of conduits positioned beneath the level of the molten glass contained therein, a draw-pot provided with passages in direct communication with said conduits, and means for limiting the two ends of the sheet forming area of glass and for defining one side of said passages, said means directing the flow of glass around opposite ends of the sheet forming area to both sides of the glass being drawn, said pot being provided with an overflow passage for controlling the glass level therein.

10. In sheet glass drawing apparatus, a glass melting tank provided with a plurality of conduits positioned beneath the level of the molten glass contained therein, a draw-pot provided with passages in direct communication with said conduits, and partitions rising from the bottom of said pot for limiting the two ends of the sheet forming area of glass and for defining one side of said passages; said partitions directing the flow of glass around opposite ends of the sheet forming area to both sides of the glass being drawn.

11. In sheet glass drawing apparatus, a glass melting tank provided with a plurality of conduits positioned beneath the level of the molten glass contained therein, a draw-pot provided with passages aligning with said conduits, and partitions rising from the bottom of said pot for limiting the two ends of the sheet forming area of glass and for defining one side of said passages, said partitions directing the flow of glass around opposite ends of the sheet forming area to both sides of the glass being drawn, said pot being provided with an overflow passage for controlling the glass level therein.

12. In sheet glass drawing apparatus, a glass melting tank provided with a plurality of conduits positioned beneath the level of the molten glass contained therein, a draw pot provided with passages aligning with said conduits, partitions rising from the bottom of said draw pot inwardly of the opposite sides thereof, said partitions limiting the two ends of the sheet forming area of glass and defining one side of said passages, and a heated chamber surrounding said draw-pot and passages.

13. In sheet glass drawing apparatus, a glass melting tank provided with a plurality of conduits positioned beneath the level of the molten glass contained therein, a draw-pot provided with passages aligning with said conduits, partitions rising from the bottom of said draw-pot inwardly of the opposite sides thereof, said partitions limiting the two ends of the sheet forming area of glass and defining one side of said passages, and a heated chamber surrounding said draw-pot and passages, said pot being provided with an overflow passage for controlling the glass level therein.

14. In sheet glass drawing apparatus, a glass melting tank provided with a plurality of conduits, a draw-pot provided with passages aligning and in direct communication with said conduits, means for drawing a sheet from said pot, and means for carrying away any surplus glass in said pot.

15. In sheet glass drawing apparatus, a glass melting tank provided with a plurality of conduits, a draw-pot provided with passages aligning and in direct communication with said conduits, and means for drawing a sheet from the draw-pot, said pot being provided with an inclined overflow passage for controlling the glass level therein.

16. In sheet glass apparatus, a draw-pot from which a sheet of glass may be continuously drawn, said pot being provided with a plurality of passages for receiving molten glass from a source of supply and being further provided with a spillway for carrying away any surplus glass therein, and partitions rising from the bottom of said pot inwardly of the opposite sides thereof for limiting the two ends of the sheet forming area and for defining one side of said passages.

Signed at Toledo, in the county of Lucas, and State of Ohio, this 26th day of May, 1924.

JOSEPH A. REECE.